United States Patent [19]
Fitzpatrick-Ellis et al.

[11] Patent Number: 5,199,540
[45] Date of Patent: Apr. 6, 1993

[54] FRICTION FACING MATERIAL AND CARRIER ASSEMBLY

[75] Inventors: John F. Fitzpatrick-Ellis; Richard D. Cooke, both of Warwick; Stuart J. Sleath, Leamington Spa, all of United Kingdom

[73] Assignee: Automotive Products plc, England

[21] Appl. No.: 730,787

[22] PCT Filed: Jan. 25, 1990

[86] PCT No.: PCT/GB90/00098

§ 371 Date: Jul. 24, 1991

§ 102(e) Date: Jul. 24, 1991

[87] PCT Pub. No.: WO90/08908

PCT Pub. Date: Aug. 9, 1990

[30] Foreign Application Priority Data

Jan. 27, 1989 [GB] United Kingdom ............... 8901880

[51] Int. Cl.5 .................. F16D 13/64; F16D 69/04
[52] U.S. Cl. .................. 192/70.11; 192/107 C; 192/107 M
[58] Field of Search .......... 192/107 C, 107 R, 107 M, 192/70.14, 70.11, 52

[56] References Cited

U.S. PATENT DOCUMENTS

| | | | |
|---|---|---|---|
| 2,253,316 | 8/1941 | Armitage | 192/107 R |
| 3,231,058 | 1/1966 | Batchelor et al. | 192/107 R |
| 4,375,254 | 3/1983 | Lech, Jr. | 192/107 C |
| 4,529,079 | 7/1985 | Albertson | 192/107 C |
| 4,533,032 | 8/1985 | Lamarche | 192/107 M |
| 4,646,900 | 3/1987 | Crawford et al. | 192/107 R |
| 4,821,860 | 4/1989 | Crawford et al. | 192/107 C |
| 5,076,410 | 12/1991 | Maycock et al. | 192/107 R |

FOREIGN PATENT DOCUMENTS

| | | |
|---|---|---|
| 0252583 | 1/1988 | European Pat. Off. |
| 2619536 | 11/1977 | Fed. Rep. of Germany |
| 58-184321 | 10/1983 | Japan ............... 192/107 C |
| 2044864 | 10/1980 | United Kingdom |
| 2141190 | 12/1984 | United Kingdom |
| 89/05411 | 6/1989 | World Int. Prop. O. |
| 89/05927 | 6/1989 | World Int. Prop. O. |

*Primary Examiner*—Richard Lorence
*Attorney, Agent, or Firm*—Davis, Bujold & Streck

[57] ABSTRACT

A friction material and carrier assembly for a clutch driven plate, the assembly being intended for rotation about an axis and comprising a carrier (4), first and second arrays of friction material (20, 22) disposed on opposite sides of the carrier (4) each array of friction material being disposed about a respective locus substantially centered on the axis. The first and second arrays of friction material are secured to the carrier by means of first and second adhesive bonds, respectively. The second adhesive bond (24) is of elastomeric material providing resilient cushioning relative to the carrier (4) (in an axial direction of the assembly) for the second array of friction material (22), and the first adhesive bond (23) is substantially non resilient providing no or substantially no cushioning relative to the carrier (4) (in an axial direction of the assembly) for the first array of friction material (20) than is provided by the second adhesive bond for the second array of friction material.

26 Claims, 6 Drawing Sheets

FRICTION FACING MATERIAL AND CARRIER ASSEMBLY

This invention relates to a friction facing material and carrier assembly for a clutch driven plate.

The driven plate may be used in a dry friction clutch.

In particular, though not exclusively, the clutch driven plate may be used in a clutch for a motor vehicle.

It is known to have a friction material and carrier plate assembly comprising a carrier plate substantially in the form of a disc and two annular arrays of friction material arranged coaxially with the carrier plate and attached to opposite sides of the carrier plate by layers of adhesive. An example of such an assembly is disclosed in GB-A-2170871 which describes a carrier plate having voids therein which are between the arrays of friction material and allow axial flexibility in the assembly.

There has been a previous proposal, as disclosed in EP-A-252583, to bond first and second annular arrays of friction material to opposite sides of a carrier using silicone rubber as the adhesive, to produce a friction material and carrier assembly for a clutch driven plate. The two layers of silicone rubber are both relatively thick to provide resilient cushioning for the friction material.

Another method of providing cushioning between the friction material elements is described in GA-A-2191831. That document discloses a carrier plate having two sets of spokes at the periphery thereof, the two sets being spaced apart axially and having a layer of deformable elastomeric material there-between. Annular friction material elements adhered to the two sets of spokes are cushioned by the layer of elastomeric material.

According to the invention there is provided a friction material and carrier assembly for a clutch driven plate, the assembly being intended for rotation about an axis, and said assembly comprising a carrier having first and second opposite sides, a first array of friction material being disposed at said first side, a second array of friction material being disposed at said second side, each array of friction material being arranged circumferentially about said axis, said first array of friction material being secured to the carrier by means of a first adhesive bond, the second array of friction material being secured to the carrier by mean of a second adhesive bond, said second adhesive bond being of elastomeric material providing resilient cushioning relative to the carrier for the second array of friction material, and the first adhesive bond providing less cushioning that the second adhesive bond thereby to allow less axial movement relative to the carrier for the first array of friction material than is provided for the second array of friction material.

According to the present invention there is also provided a friction clutch assembly comprising a pressure plate, a reaction member and a driven plate all rotatable about a common axis, the driven plate being axially between the pressure plate and the reaction member, the pressure plate being movable axially with respect to the reaction member to engage the driven plate with the pressure plate and the reaction member, the driven plate comprising a friction material and carrier assembly according to the invention.

In an assembly formed according to the invention, the elastomeric material providing bonding and cushioning is primarily only on the second side of the carrier. The bond on the first side can be much thinner than that on the second side. Thus by comparison with the aforesaid previously proposed assembly having two equally thick layers of elastomeric material (when the latter is unworn), the axial distance between the friction faces of the arrays of friction facing material can be less in an unworn assembly formed in accordance with the invention. This enables an axially slimmer clutch driven plate to be produced. Alternatively the axial thickness of the second array of friction material can be increased to keep the initial axial thickness of the assembly equal to the axial thickness of the previously proposed assembly when the latter is unworn. Such an increase in the thickness of the second array of friction material increases the wear life of a clutch driven plate incorporating an assembly formed according to the invention by comparison with one incorporating the previously proposed assembly.

Also, hitherto, in clutch driven plates for heavy commercial vehicles using cerametallic material for the friction facings, it has been usual practice not to provide the friction facings with any axial cushioning. But now some demand for cushioning is appearing. With that in mind it is believed that an assembly formed in accordance with the invention and used in clutch driven plates may meet that requirement.

The invention will now be further described by way of example, with reference to the accompanying drawings in which.

In the following description like references identify like parts.

Figure 2:
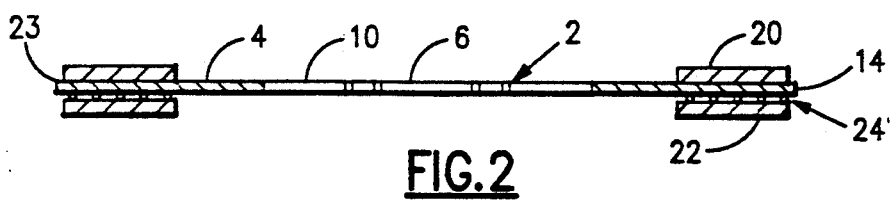
FIG. 2 is a section on line II—II in FIG. 1.
Figure 3:
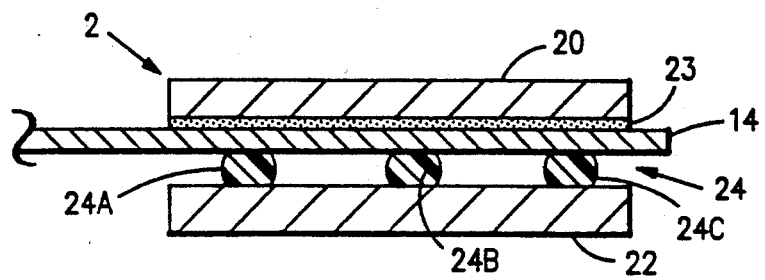
FIG. 3 is a section, on an enlarged scale with respect to FIG. 2, of a fragment of the first embodiment.
Figure 4:
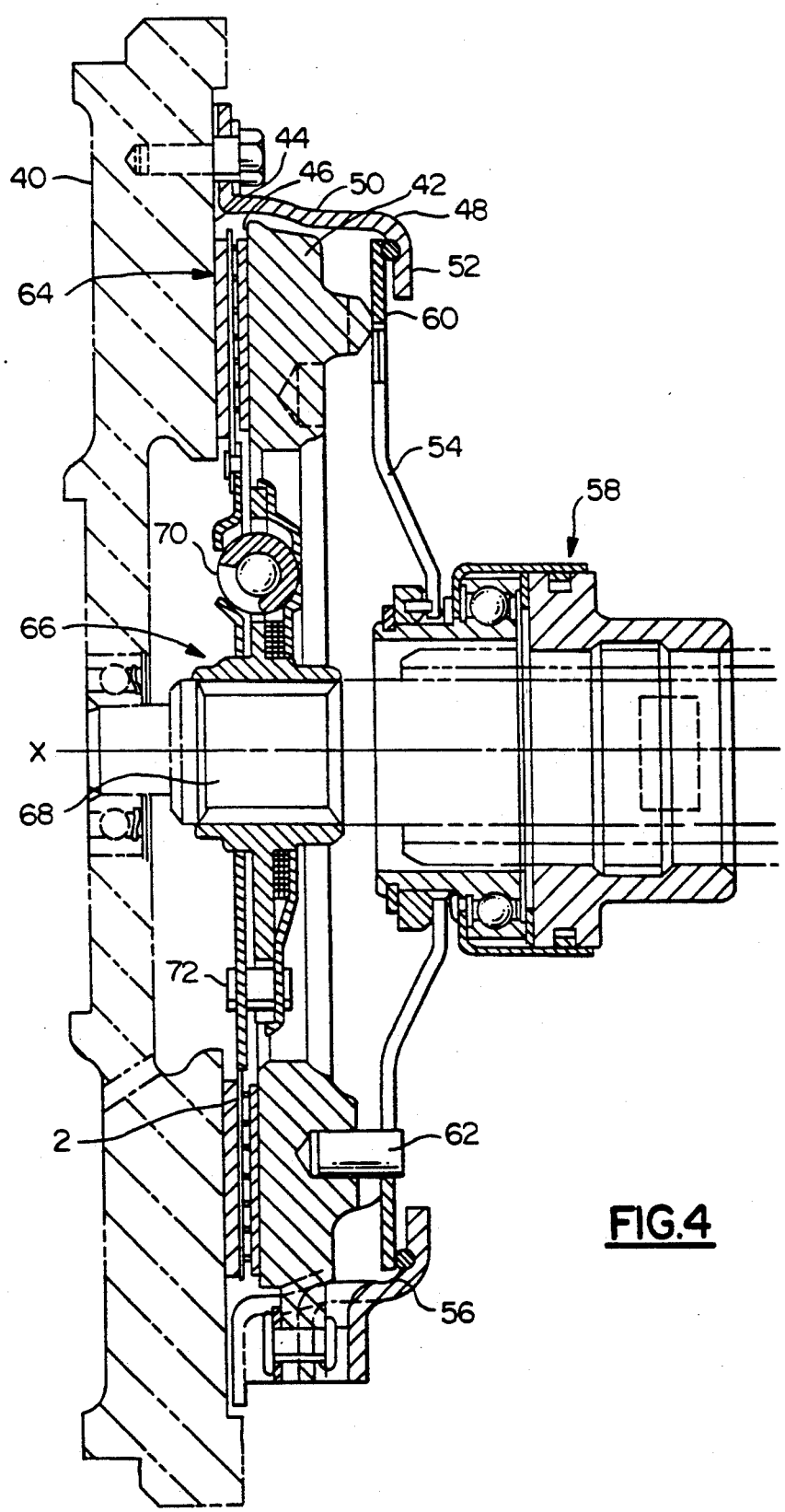
FIG. 4 is a sectional view of the assembly of FIGS. 1 to 3 incorporated in a clutch.

With reference to FIGS. 1 to 4, a friction material and carrier assembly is shown at 2 and forms part of a friction clutch driven plate which is used in a clutch, for example, a diaphragm spring clutch of a motor vehicle as shown particularly in FIG. 4.

The carrier assembly 2 comprises a flat steel carrier plate 4 of disc form centrally apertured at 6 to fit an internally splined hub 68 when the assembly is incorporated in the driven plate. Also the carrier plate is formed with windows 10 for torsional vibration damping springs 70 and holes 12 for stop rivets 72.

At its periphery the carrier plate 4 has a plurality of outwardly projecting paddles or spokes 14 integral with the main body of the carrier plate. The spokes are flat being substantially equi-angularly spaced about a central axis X about which the assembly 2 is intended to rotate in use. Voids in the form of slots 16 space the spokes which have substantially radial opposite edges 18.

In the example shown there are thirty spokes 14 and thirty slots 16. Circumferentially each spoke 14 extends over about 7 degrees of arc and each slot over about 5 degrees. If desired the number, size, shape and spacing of the spokes can be varied.

The spokes 14 are axially pliable in the sense of being leaf springs capable of flexing resiliently along directions substantially parallel to the axis X. This enables the carrier plate 4 at the spokes 14 to be sinuously flexible circumferentially.

First and second arrays of friction material in the form of two substantially coincident and co-axial annular friction facings 20 and 22 are respectively bonded to opposite faces of each spoke 14. Each friction facing 20, 22 has an outer edge diameter of 200 mm and an inner edge diameter of 130 mm. The friction facing 20 is bonded to the spokes by an adhesive 23. The adhesive 23 is REDUX 80 (Trade Mark) which is a heat setting nitrile phenolic resin adhesive. Various heat setting phenolic resins may be used as the adhesive, as well as other synthetic resin adhesives. The friction facing 22 is bonded to the spokes 14 by an elastomeric material 24 which is adhered directly to the friction facing 22 and to the spokes 14. The elastomeric material 24 in this embodiment is silicone in a heat curing rubber form which is disposed in a fluid form between the facing 22 and the spokes 14. Alternatively the silicone may be in RTV form, in which case it is subjected to heat and a moist atmosphere to promote curing to create the adhesive bond between the facing 22 and the spokes. The application of that heat also has the effect of curing the heat setting phenolic resin layer 23.

The rubber may be disposed on the facing in paste form. The elastomeric layer 24 is of an appreciable thickness so that it can act as resilient cushioning permitting movement of friction facing 22 in the axial direction relative to the paddles 14. On the other hand the adhesive layer 23 is by comparison non- or substantially non-resilient so that it provides no or substantially no cushioning for the friction facing 20 relative to the spokes 14.

Each friction facing 20,22 can be formed of any suitable friction material and may be of a non-asbestos type.

Advantageously the friction facings 20,22 can be somewhat flexible such that each can flex or deform at least circumferentially. When this characteristic is combined with the sinuous flexibility of the carrier plate 4, the whole of the friction facings and carrier plate assembly can be sinuously flexible circumferentially at the spokes 14. To help maintain the integrity of the bond provided by the adhesive 23 the latter may include a softener to render the bond somewhat compliant.

The elastomeric material 24 may be present in discrete spaced amounts. In the example shown in FIGS. 1 to 3 the elastomeric material is in the form of discrete, radially spaced amounts as continuous or substantially continuous concentric annular stripes or beads 24A, 24B, and 24C, having substantially the same centre on the axis X. The beads have a mass per unit length of from 10 to 15 g/m and are extruded through a nozzle of 2.4 mm diameter. In an alternative the elastomeric material may take the form of at least one continuous or substantially continuous stripe or bead disposed as a spiral about the axis X, in which successive turns of the spiral are radially spaced apart. For the same dimensions of friction facing and bead mass as described above, the pitch of the spiral would be about 8 mm.

Figure 1:
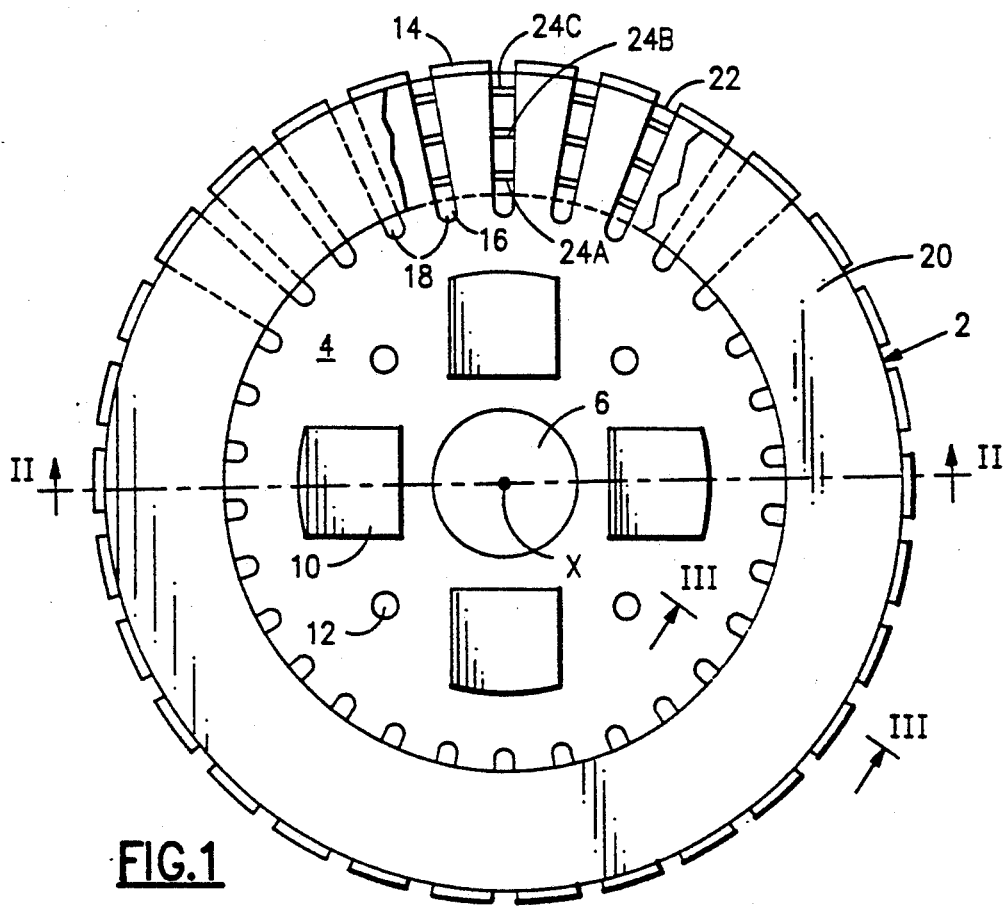
FIG. 1 is a plan view of a friction material and carrier assembly formed according to a first embodiment of the invention and intended to form part of a friction clutch driven plate.

In FIG. 4 where the clutch assembly incorporates the friction material and carrier assembly 2 shown in FIGS. 1 to 3, a reaction member, formed by a flywheel 40, and a pressure plate 42 is arranged so as to be rotatable about a common axis X. The flywheel 40 has a flywheel annular surface 44 and the pressure plate 42 has a pressure plate annular surface 46, the two annular surfaces facing each other and being partly radially coextensive. A cover 48 is connected to the flywheel annular surface 44 radially outside the pressure plate 42 and extends over the pressure plate 42 to form a substantially cylindrical part 50 and then curves radially inwardly to form a lip 52. A diaphragm spring 54 has its outer edge 56 resting against the corner 48 between the cylindrical part 50 and the lip 52, and the inner ends of its fingers attached to a release bearing 58. The diaphragm spring 54 abuts the pressure plate 42 on an annular fulcrum 60 extending therefrom. Drive pins 62 prevent relative rotation of the diaphragm spring 54 and the pressure plate 42.

A driven plate 64 comprises the friction material and carrier assembly 2 shown in FIGS. 1 to 3. The driven plate 64 is positioned such that the friction facings 20,22 are between the flywheel annular surface 44 and the pressure plate annular surface 46 the second friction facing 22 being towards the pressure plate 42. The driven plate 64 is mounted on a central hub 66 which is rotatable about the axis X.

As the clutch is engaged the pressure plate 42 moves towards the flywheel 40. The driven plate is thereby moved towards the flywheel 40. After the first friction facing 20 has made contact with the flywheel 40 the carrier 14 cannot move much closer to the flywheel and further movement of the pressure plate compresses the second adhesive layer 24. Since the first friction facing 20 (having the relatively non-resilient adhesive layer 23) is towards the flywheel 40 the movement of the carrier plate 14 during engagement and disengagement of the clutch is less than with a known driven plate in which both friction facings are adhered to the carrier plate with equally thick layers of an elastomeric material. This can result in a reduction in judder with the assembly of the invention.

Figure 5:
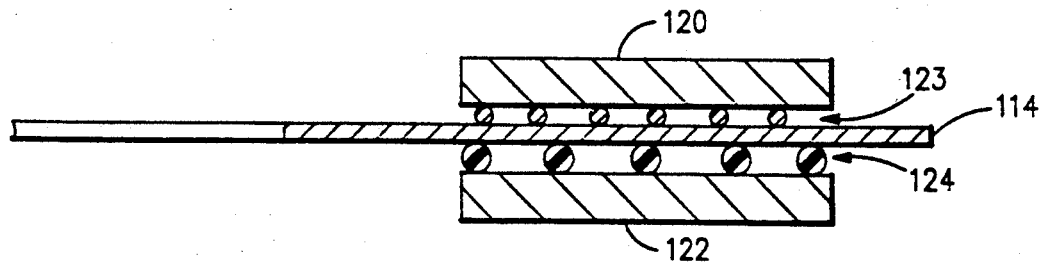
FIG. 5 is a section similar to FIG. 3, of a fragment of a second embodiment of the invention.

As shown in FIG. 5 the carrier 114 and friction facings 120,122 of the second embodiment are identical to the carrier 14 and friction facings 20,22 of the first embodiment and will not be described in detail.

The first friction facing 120 is adhered to the carrier plate 114 by adhesive 123 which is in the form of a small diameter spiral bead of heat setting silicone rubber. The second friction facing 122 is adhered to the carrier plate 114 by an adhesive 124 in the form of a spiral bead of heat setting silicone rubber which is larger in diameter than that used for the first friction facing 120. The larger diameter bead has approximately the same mass per unit length as the bead of the first embodiment but it must be reduced if the combined effect of the larger and smaller diameter beads is to produce the same amount of cushioning as is provided by the first embodiment.

The small diameter spiral bead 123 provides substantially less cushioning for the first friction facing 120 than the larger diameter spiral bead 124 provides for the second friction facing 122. Thus this embodiment can reduce the movement of the carrier plate when a clutch incorporating the assembly of this embodiment of the invention is engaged and disengaged as described above with reference to FIG. 4. The slight cushioning of the first friction facing 120 can also result in a reduction in judder in the clutch. Furthermore with the first and second friction facings being adhered to the carrier with similar types of adhesive, there is less chance of distortion of the carrier during the setting of the adhesive which can result in coning of the carrier if different adhesives are used.

Figure 6:
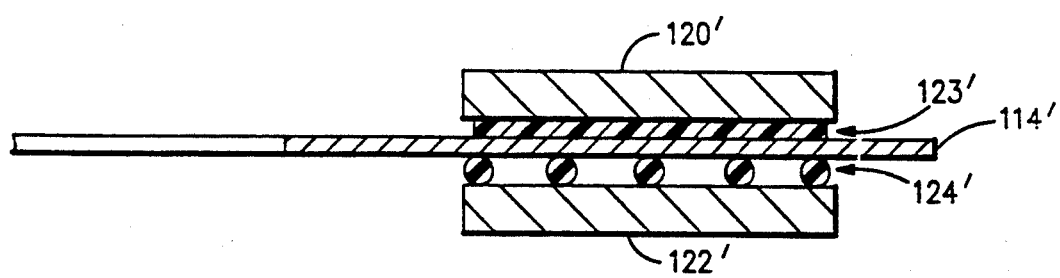
FIG. 6 is a section similar to FIG. 5 showing a modification of the second embodiment of the invention.

In the modification shown in FIG. 6, the first and second friction facings 120', 122' are loaded to a carrier plate 114' by adhesives 123' and 124' respectively. The only modification is that the adhesive 123' between the first friction facing 120' and the carrier plate 114' is formed from a heat setting silicone rubber film.

Instead of heat setting silicone rubber, two part silicone rubber adhesives can be used for either or both of the friction facings. This can reduce the restrictions on the conditions under which the adhesive is applied and set, and in particular can reduce the amount of ventilation needed to the adhesive while it is setting.

Figure 7:
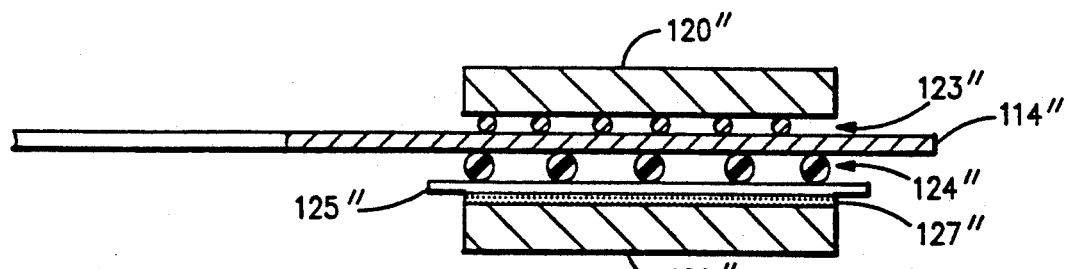
FIG. 7 is a section similar to FIG. 5 showing a further modification of the second embodiment of the invention.

In the modification shown in FIG. 7, first and second friction facings 120" and 122" are bonded to a carrier plate 114" by adhesives 123" and 124" respectively. In this modification the second friction facing 122" is adhered by rigid adhesive 127" to an annular support plate 125".

Figure 8:
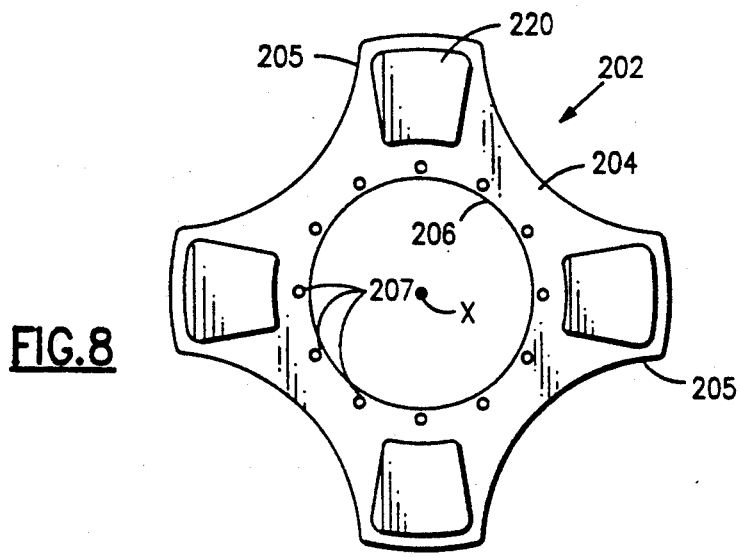
FIG. 8 is a plan view of a third embodiment of a friction material and carrier assembly formed according to the invention and intended to form part of a friction clutch driven plate.
Figure 9:
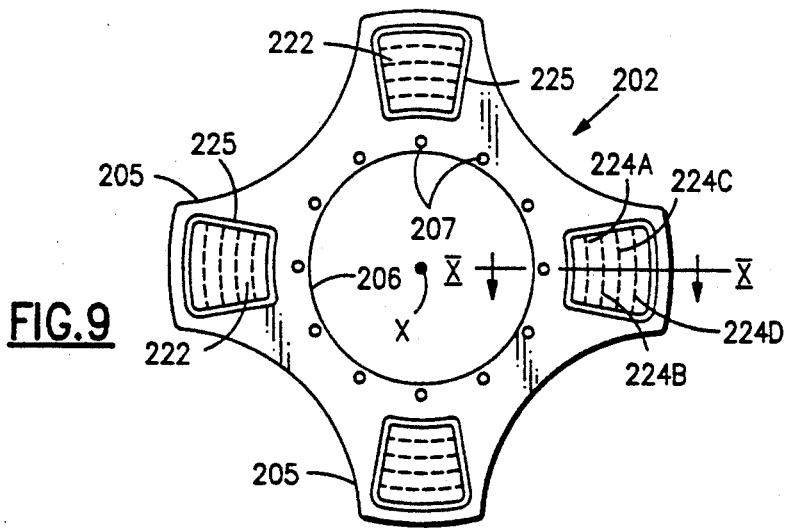
FIG. 9 is an inverse plan view of the assembly in FIG. 8.
Figure 10:
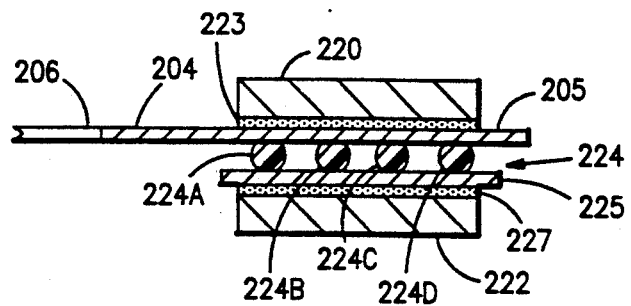
FIG. 10 is a section on line X—X in FIG. 9 but on an enlarged scale with respect to FIG. 9.

With reference to FIGS. 8 to 10 a friction material and carrier plate assembly 202, suitable for a friction clutch driven plate which can be used in a clutch for a motor vehicle, for example a commercial vehicle, comprises a flat steel carrier plate 204 of a generally cruciform shape comprising four spokes or arms 205 and a central aperture 206 to fit, for example, about an internally splined hub (not shown) known per se when the assembly is incorporated in a said driven plate. The carrier plate 204 is formed with a circular array of holes 207 to receive rivets (not shown) securing the assembly 202 to, for example, a torsion vibration damper unit (not shown) known per se mounted on the hub. The plate 204 and its arms 205 can be stiff.

In use the assembly 202 is intended to rotate about axis X.

Friction material in the form of buttons or pads 220 is disposed along a circular locus centred on the axis X, each pad 220 being adhered at 223 to a respective arm 205. On the other side of the carrier 204 more friction material in the form of buttons or pads 222 is disposed along a circular locus centred on the axis X, each pad 222 being disposed opposite a said arm 205. Each pad 222 is adhered at 227 to a respective metal backing or support plate 225, for example a steel plate, in turn bonded to a respective arm 205 by a respective layer of elastomeric material 224, for example a heat resistant synthetic rubber which can be of the same kind as referred to above with reference to FIGS. 1 to 7.

The elastomeric layer 224 is of an appreciable thickness so that it can act as resilient cushioning permitting movement of each friction pad 222 in the axial direction relative to the corresponding arm 205. On the other hand the nature of the adhesion at 223 is by comparison non or substantially non resilient so that it provides no or substantially no cushioning for the friction pads 220 relative to the arms 205.

The elastomeric material 224 can be present in discrete spaced amounts. In the example in FIGS. 5 to 7 the elastomeric material 224 corresponding to each pad 222 is in the form of discrete, radially spaced, stripes or beads 224A, 224B 224C and 224D each in the form of a continuous or substantially continuous arc centred on the axis X. Alternatively the elastomeric material 224 at each pad 222 could be in the form of a bead following a zig-zag path back and forth between the generally radial sides of the pad 222.

Figure 11:
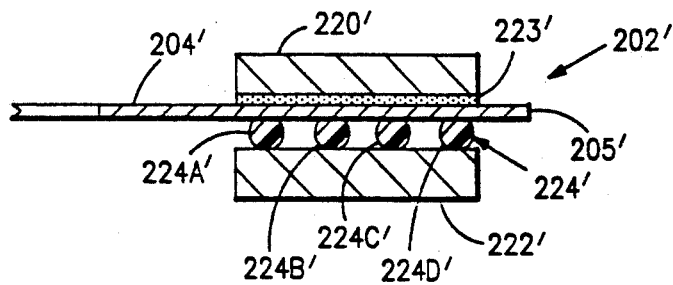
FIGS. 11, 12 and 13 are sections (similar to FIG. 9) of respective modifications of the assembly shown in FIGS. 8 to 10.

In the modified assembly 202' in FIG. 11 each friction pad 222 is bonded directly (no backing plate being provided) to the respective arm 205' by the elastomeric beads 224A', 224B', 224C' and 224D'. Otherwise the modification of FIG. 11 is the same as the embodiment of FIGS. 6 to 10, like reference numbers indicating like parts.

Figure 12:
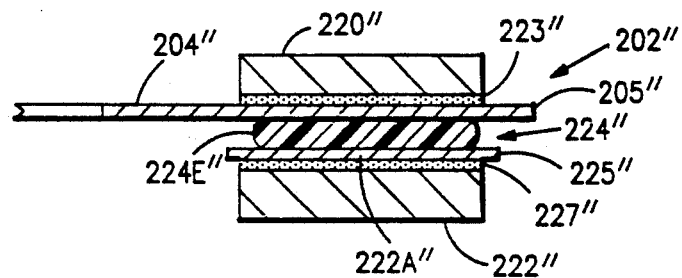

FIG. 12 shows a modification in which each backing plate 225" of each friction pad 222" is bonded to the respective arm 205" by a layer 224" of elastomeric material in the form of a cushion or pad 224E" which can extend substantially continuously over substantially all or a major part of the area of the backing plate 225". Thus elastomeric pad 224E" extends substantially continuously over substantially all or a major part of the area of a main face 222A" of a respective friction pad 222". Otherwise the modification of FIG. 12 is the same as the embodiment of FIGS. 6 to 10, like reference numbers indicating like parts.

Figure 13:
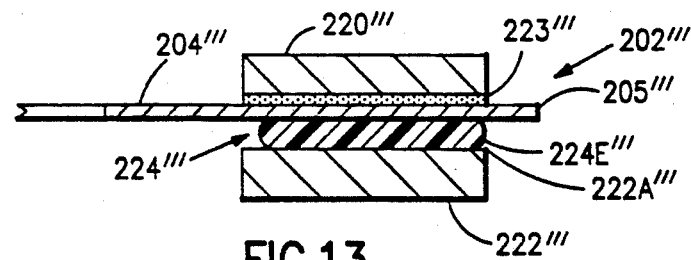

In the modification in FIG. 13 each pad 222''' of friction material is bonded directly (no backing plate being provided) to a respective arm 205''' by a respective pad 224E''' of elastomeric material which can extend substantially continuously over substantially all or a major part of the area of the main face 222A''' of the pad 222 of friction material. Otherwise the modification of FIG. 13 is the same as the embodiment of FIGS. 6 to 10, like reference numbers indicating like parts.

Figure 14:
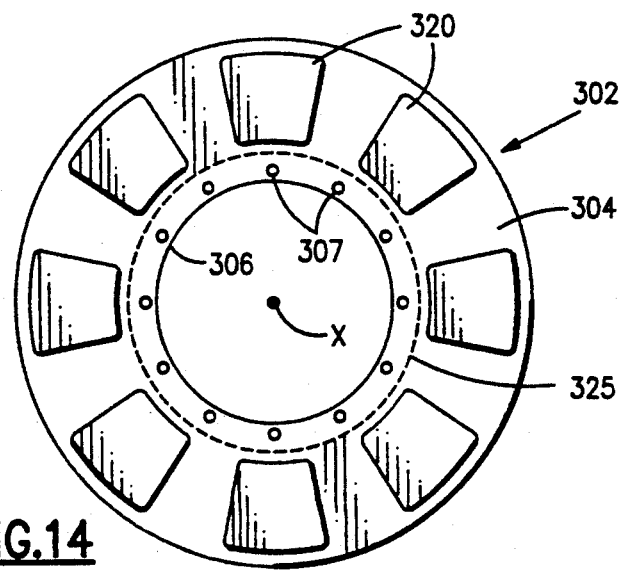
FIG. 14 is a plan view of a fourth embodiment of a friction material and carrier assembly formed according to the invention and intended to from part of a friction clutch driven plate.
Figure 15:
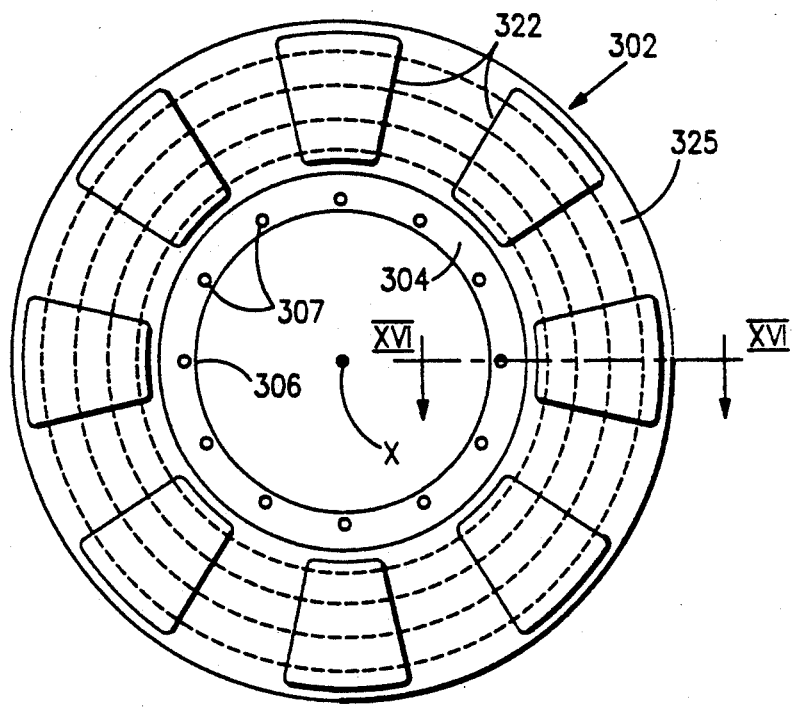
FIG. 15 is an inverse plan view of the assembly in FIG. 14.
Figure 16:
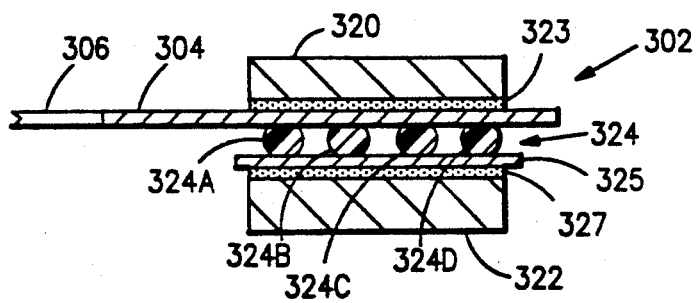
FIG. 16 is a section on line XVI—XVI in FIG. 15 but on an enlarged scale with respect to FIG. 15.

With reference to FIGS. 14 to 16 a friction material and carrier plate assembly 302 suitable for a friction clutch driven plate which can be used in a clutch for a motor vehicle, for example a commercial vehicle, comprises a flat steel annular carrier plate 304 provided with a central aperture 306 and an array of holes 307 for the same purposes as central aperture 206 and holes 207 described with reference to FIGS. 8 to 10.

In use the assembly 302 is intended to rotate about the axis X. Buttons or pads 320 of friction material are disposed along a circular locus centred on the axis X, each pad 320 being adhered at 323 to the plate 304. On the other side of the carrier plate 304 more friction material in the form of buttons or pads 322 is disposed along a circular locus centred on the axis X. Each pad 322 may be disposed substantially opposite a said pad 320. All the pads 322 are respectively adhered at 327 to a common annular, metal backing or support plate 325, for example a steel plate, in turn bonded to the carrier plate 304 by the layer 324 of elastomeric material. Again the elastomeric layer 324 is of an appreciable thickness enabling it to act as resilient cushioning permitting movement of the friction pads 322 and their backing plate 325 in the axial direction relative to the carrier plate 304. Whereas, by comparison, the adhesion at 323 is non- or substantially non-resilient thus providing no or substantially no cushioning for the friction pads 320 relative to the carrier plate 304.

In the embodiment shown in FIGS. 14 to 16 the elastomeric material 324 is again in the form of continuous or substantially continuous concentric stripes or beads 324A, 324B, 324C and 324D. But again, as an alternative, the elastomeric material 324 may be in the form of at least one continuous or substantially continuous stripe or bead disposed as a spiral about the axis X.

If desired, the carrier plate 304 and/or the backing plate 325 may be stiff.

The friction pads 320 and 322 may be of a cerametallic material or sintered metal.

In an alternative the friction pads or buttons 320 and 322 can be formed of a paper or paper like material produced from a pulp of cellulose and/or synthetic fibres. In this case the adhesive at 323 and 327 can be a heat setting adhesive, for example a phenolic resin adhesive. REDUX 80 is a suitable adhesive.

We claim:

1. A friction material and carrier assembly for a clutch driven plate, the assembly being intended for rotation about an axis and said assembly comprising a carrier having first and second opposite sides, a first array of friction material disposed at said first side, a second array of friction material disposed at said second side, each array of friction material being arranged circumferentially about said axis, a first adhesive bond securing the first array of friction material to the carrier and a second adhesive bond securing the second array of friction material to the carrier, said second adhesive bond being of an elastomeric material providing resilient cushioning relative to the carrier for the second array of friction material, and said first adhesive bond being axially thinner than said second adhesive bond to provide e less axial cushioning movement than said second adhesive bond thereby to allow less axial movement relative to the carrier for the first array of friction material than is provided for the second array of friction material.

2. An assembly as claimed in claim 2, in which the second adhesive bond is in the form of spaced portions of said elastomeric material.

3. An assembly as claimed in claim 2, in which said spaced portions are beads each extending circumferentially about said axis.

4. An assembly as claimed in claim 1 in which the carrier comprises spokes provided at an outer periphery of the carrier, said spokes are resiliently pliable axially with respect to said axis, and the first and second arrays of friction material are adhered to the spokes by said first and second adhesive bonds respectively.

5. An assembly as claimed in claim 4, in which the friction material and carrier assembly is sinuously flexible circumferentially at the region of said spokes and friction material.

6. An assembly as claimed in claim 1 further comprising a support plate which has at least a part of said second array mounted thereon and is adhesively bonded to said carrier by said second adhesive bond.

7. An assembly as claimed in claim 1 further comprising a plurality of support plates having said second array mounted thereon and being adhesively bonded to said carrier by said second adhesive bond.

8. An assembly as claimed in claim 7, in which said friction material of said second array is adhesively bonded to said support plate(s).

9. An assembly as claimed in claim 1, in which the first array of friction material is an integral annulus of friction material substantially centered on said axis.

10. An assembly as claimed in claim 1 in which the second array of friction material is an integral annulus of friction material substantially centered on said axis.

11. An assembly as claimed in claim 1 in which the first array of friction material is formed by spaced pads of friction material.

12. An assembly as claimed in claim 1 in which the second array of friction material is formed by spaced pads of friction material.

13. An assembly as claimed in claim 12, in which the second elastomeric bond comprises a plurality of pads of elastomeric and each of the pads of friction material is secured to the carrier by means of a respective pad of elastomeric material extending over at least a major part of the area of the pad of friction material.

14. An assembly as claimed in claim 1, in which said friction material is cerametallic material.

15. An assembly as claimed in claim 6 in which the second array of friction material is bonded to the support plate(s) by synthetic resin adhesive.

16. An assembly as claimed in claim 1 in which the first adhesive bond is formed of synthetic resin adhesive.

17. An assembly as claimed in claim 1 in which said first adhesive bond provides substantially no cushioning relative to the carrier for the first array of friction material.

18. An assembly as claimed in claim 1 in which the first adhesive bond is of elastomeric material.

19. An assembly as claimed in claim 18 in which the first adhesive bond is formed of spaced portions of said elastomeric material.

20. An assembly as claimed in claim 19 in which said spaced portions are beads each extending circumferentially about said axis.

21. An assembly as claimed in claim 18 in which said first adhesive bond is formed of a film of elastomeric material.

22. An assembly as claimed in claim 18 in which said first adhesive bond is formed of a two part silicone rubber.

23. An assembly according to claim 1 wherein said second adhesive bond is formed of a two part silicone rubber.

24. A friction clutch assembly comprising a pressure plate, a reaction member and a driven plate all rotatable about a common axis, the driven plate being axially between the pressure plate and the reaction member, the pressure plate being movable axially with respect to the reaction member to engage the driven plate with the pressure plate and the reaction member, the driven plate comprising a friction material and carrier assembly as claimed in claim 1.

25. A friction clutch assembly according to claim 24, the first array of friction material being towards the reaction member and the second array of friction material being towards the pressure plate.

26. A friction clutch assembly according to claim 25 wherein the reaction member is axially fixed.

* * * * *